Jan. 17, 1939.  M. J. CROSBY  2,144,482
COMBINED LEVEL AND TRANSIT
Filed Feb. 26, 1938
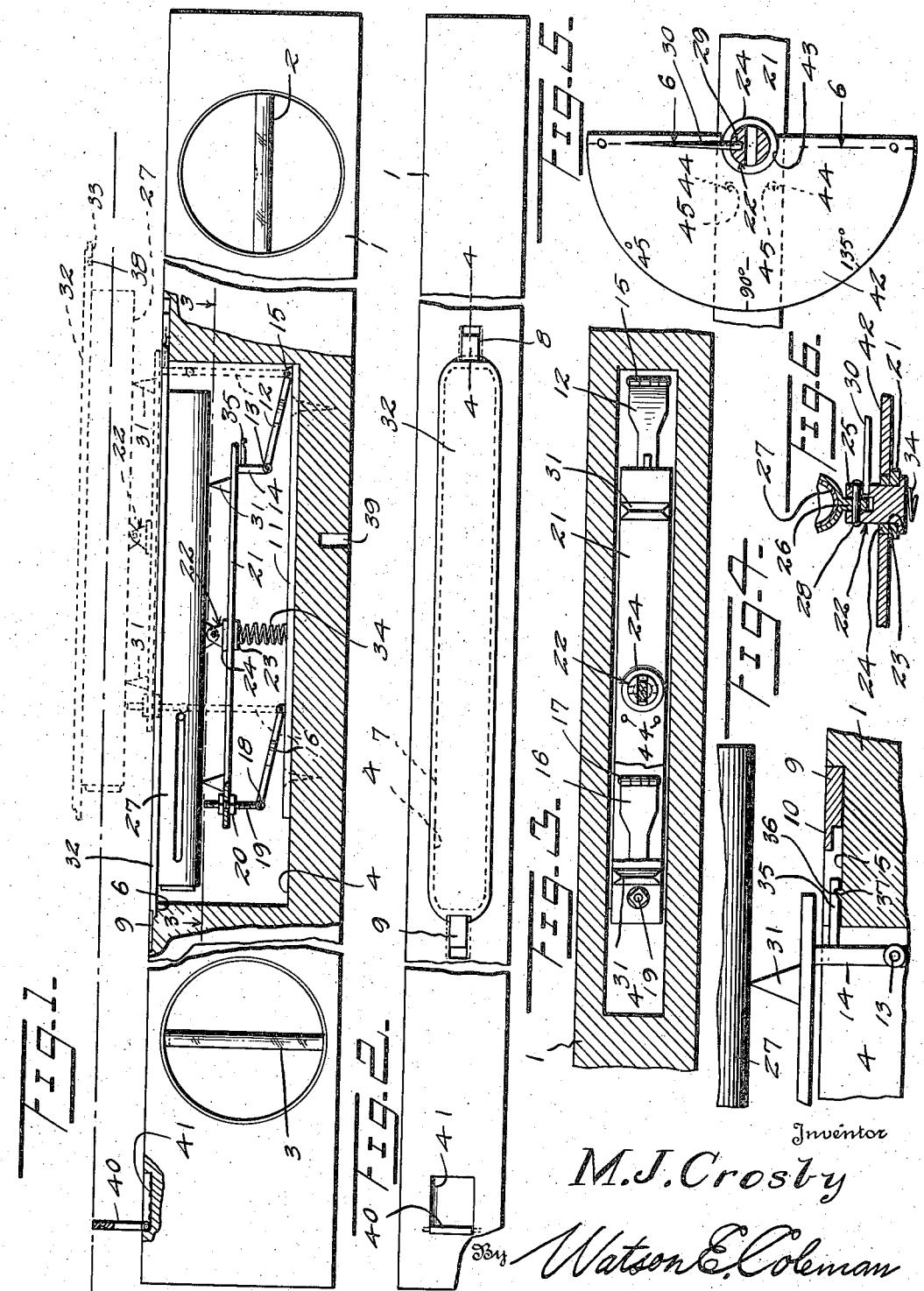
Inventor
M. J. Crosby
By Watson E. Coleman
Attorney Patented Jan. 17, 1939

2,144,482

UNITED STATES PATENT OFFICE 2,144,482

COMBINED LEVEL AND TRANSIT

Matthew J. Crosby, Matawan, N. J.

Application February 26, 1938, Serial No. 192,865

14 Claims. (Cl. 33—73)

This invention relates to the class of geometrical instruments and pertains particularly to improvements in combined levels and transits.

The primary object of the present invention is to provide a novel combined level and transit in which novel means is provided for housing the transit in the body of the level and for shifting the transit from within the level to the outside thereof and into a position in which it is set up ready for use.

Another object of the invention is to provide an improved combined level and transit in which the transit is mounted upon a collapsible carriage structure which facilitates raising and lowering the transit with respect to a housing chamber in the level whereby the transit, when desired for use, may be drawn out of the housing chamber in a manner to automatically position it above the level and parallel therewith so that it may immediately be put into use.

Still another object of the invention is to provide a novel combined level and transit structure in which the transit is mounted in the novel manner stated and in which a novel means is employed for adjusting the transit when necessary to bring it into a position of parallelism with the top of the level body.

Still another object of the invention is to provide a novel mounting means for a transit which is adapted to be used in association with a straight edge or level whereby the transit may be firmly supported when not in use and whereby an easy adjustment may be made of the transit to bring its longitudinal center into a parallel relation with the adjacent edge of the straight edge structure upon which it is mounted.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view partly in side elevation and partly in longitudinal section through a level or straight edge of a type commonly employed by builders, with a portion of the same in longitudinal section to show the manner in which the transit structure is incorporated therewith.

Figure 2 is a view in top plan of the level and transit structure constructed in accordance with the present invention.

Figure 3 is a sectional view taken on the line 3—3 of Figure 1.

Figure 4 is an enlarged sectional view taken substantially upon the line 4—4 of Figure 2, when the transit structure has been raised, to illustrate the means for securing the transit in raised position.

Figure 5 is a view illustrating the application of a protractor scale and pointer to the transit support for use in association with the transit when laying off building foundation lines, etc.

Figure 6 is a sectional view taken substantially upon the line 6—6 of Figure 5.

Referring now more particularly to the drawing, the numeral 1 generally designates a level stock in which are mounted adjacent the ends, the usual bubble glasses 2 and 3 by the use of which structures may be located in horizontal and vertical positions. These bubble glasses are known respectively as leveling and plumbing glasses.

In the construction of the combined level and transit in accordance with the present invention, the level stock 1 has formed therein adjacent one end, which may be referred to as the rear end, and between the glasses 2 and 3, the chamber 4 which opens through one side edge of the stock 1, which will be hereinafter referred to as the top of the level stock. In Figure 1, the stock has been shown as broken transversely between the glasses and at the ends of the chamber 4 but it is to be understood that the chamber is adjacent the rear or leveling glass 2, as previously stated. This chamber extends lengthwise of the stock, as shown in Figures 2 and 3, and is relatively narrow and at the ends there are formed the shoulders 5 and 6. These shoulders are shown as merging with side shoulders 7 but it will be apparent that from the following description that the side shoulders may be eliminated if desired.

At each end of the chamber 4 there is formed in the top of the level stock the recess 8 which has its sides undercut to form dovetail guides and each recess has disposed therein a slide latch 9, the side edges of which are dovetailed to engage in the side slots of the recess so that the latch may be shifted longitudinally therein without becoming disengaged therefrom. Each slide has a tongue at the end adjacent the chamber for engagement with a cover body for the chamber which will be hereinafter particularly referred to.

Secured in the bottom of the chamber 4 is a plate 11. Adjacent one end of this plate, there is pivotally secured an arm 12 which, at its lower end, is relatively wide, as shown in Figure 3, while the upper end is narrower and has hinge connection at 13 with a terminal leaf 14. The lower end of the arm 12 is pivotally attached to the plate 11 by the hinge 15.

Adjacent the other end of the base plate 11 and in approximately the central portion of the chamber 4 is an arm 16 which is of the same form as the arm 12 and has its lower edge pivotally connected to the plate 11 by the hinge 17, while its narrow upper end is connected by the hinge 18 with one end of a threaded adjusting screw 19 which carries two spaced adjusting nuts 20.

The numeral 21 designates the telescope supporting plate which is of sufficient length to connect the parts 14 and 19 and to move into the chamber 4. The part 14 referred to previously as the hinge leaf is permanently attached to the underside of the plate 21 adjacent one end of the latter, while the screw 19 passes freely through an aperture in the plate 21 adjacent the other end thereof, the adjusting nuts 20 having the plate 21 located therebetween so that this end of the plate may be raised and lowered slightly to make certain adjustments of the structure which it carries.

At the center of the telescope carrying plate 21 there is pivotally mounted a post 22. This post passes through a suitable aperture in the plate 21 and has a head 23 upon its underside, while above the plate 21 it has secured about it the collar or retaining ring 24 which is secured to the post in any suitable manner and which engages the top of the plate 21 to prevent longitudinal movement of the plate but to permit rotation of the post relative to the plate.

The post 22 is slotted to form the upwardly projecting spaced ears 25 and between these ears is positioned a single hinge ear 26 which is carried by the body portion of a telescope 27. A pivot pin 28 passing through the ears 25—26 pivotally joins them together.

The post 22 is provided at one side with a socket 29 to receive a pointer 30, which is made use of, and is attached to the post, when the telescope has been raised from the chamber 4, in the manner hereinafter described.

Upon the telescope supporting plate 21, adjacent each end thereof, is a support 31 which contacts the body of the telescope, when the latter is in parallel relation with the plate 21. When the telescope is in this parallel relation with the plate, it may be housed in the chamber 4 by pressing downwardly upon the platform 21 so as to swing the supporting arms 12 and 16 downwardly, as shown in Figure 1, to bring the top of the telescope below the top of the chamber.

In order to close the top of the chamber when the telescope is depressed thereinto, as shown, the top of the telescope has secured thereto the cover plate 32. This plate is adapted to set into the top of the chamber to rest upon the end and side shoulders 5, 6 and 7, and each end of the cover plate has a lip 33 which is engaged by a latch slide 9 so as to facilitate maintaining the cover plate in chamber closing position.

Mounted upon the base plate 11 adjacent the central part of the chamber 4, is a spring 34 which is engaged by the head 23 of the post 22 when the telescope is depressed into the chamber and is maintained under compression so that when the latches 9 are shifted to release the ends of the cover plate 32, this spring will react to start the telescope and supporting plate therefor upwardly, thus making it easy for the user of the instrument to take a hold upon these parts and lift them into working positions.

In order that the structure may be properly supported against movement when it has been removed from the chamber 4 for use, the hinge leaf 14 is provided with a finger 35 which is located in such a position that when the arms 12 and 16 are raised so that the parts 14 and 19 are positioned in vertical alinement therewith, as shown in dotted outline in Figure 1, this finger 35 will move into position over the surface of the shoulder 5 to receive in the notch formed at its underside at 36, the tooth 37 which is formed upon and stands upwardly from the surface of the shoulder 5. There is thus formed a latching means for holding the telescope in its raised position. It will, of course, be understood that the under face of the cover plate 32 will be provided adjacent the end which positions upon the shoulder 5 with a suitable recess to receive this tooth 37 when the cover plate is down. Such a recess is shown in Figure 1 and indicated by the numeral 38.

In the under or bottom edge of the level stock 1, there is provided the upwardly directed pin hole 39 which is located to be upon the axial center of the post 22 when the latter with the telescope is shifted out of the chamber 4 to the working position in which it is shown in dotted lines in Figure 1. This hole is formed to facilitate mounting the stock upon a supporting pin which may be driven in any body upon which the level and transit is to be mounted so that the level will be pivotally retained in working position upon such a body to be shifted to any position desired.

Adjacent one end of the level stock, there is pivotally attached upon the top edge a gauge plate 40. This is preferably mounted so that when it is not in use it may be housed in a recess 41 and thus protected from damage.

In the use of the instrument, the level stock is first set up and is adjusted until the glass 2 shows that it has been brought to a perfectly level condition. The gauge plate 40 may then be raised as well as the telescope 27 and the telescope is brought into parallel relation with the top edge of the level stock, if necessary, by manipulating the nuts 20 so as to raise or lower the front end of the telescope until the horizontal one of the cross hairs thereof is located upon and parallel with the top edge of the plate 40. After this adjustment has been made, it will not be necessary to again adjust the telescope by means of these nuts.

For the use of the telescope in laying out foundations, after the telescope has been tested and adjusted if necessary, it is rotated to extend transversely of the level stock and to remove it from contact with the top edges of the supports 31 so that it may be oscillated freely upon the pivot pin 28. In order to determine the angles which may be required there is provided the semi-circular plate 42 which has a scale laid off adjacent its arcuate edge and extending through 180° of a circle. This plate is provided with the semi-circular recess 43 at the center of its straight edge, as shown in Figure 5, to receive the collar 24 so that the plate may rest upon the telescope supporting plate 21, as illustrated, and adjacent this central recess 43 there are secured to the plate 42, two pins 44 which are adapted to engage in apertures 45 in the plate 21, as illustrated in Figure 5. When the protractor plate 42 is secured in position, it will extend transversely of the telescope carrying plate 21 and when the pointer 30 is secured to the post 22 by having one end inserted into the aperture 29, as shown in Figure 5, it will lie over and point toward the zero mark of the protractor scale.

As an illustration of the use of the present instrument, the following examples are given. To lay out a foundation: First, a side or the front line for the foundation is run or laid off in the proper place and stakes are driven at the ends of the line to locate the positions of two corners of the foundation. A small nail is then driven into the top of one stake and this nail is used as a pivot for the level stock by arranging the stock so that the nail will extend into the pivot aperture 39. Another stake may then be driven under the line so as to support the front end of the level stock and this supporting stake should be of sufficient width across its top to permit the front end of the stock to be swung through six or eight inches of movement. The telescope is then raised in the manner described and the degree arc or protractor plate is placed in position and also the pointer. As previously stated, when the pointer is in place it should be directed toward the zero mark of the plate but if it does not point toward this marking, the front of the level is moved until the pointer is brought into this position. The telescope is then used to sight the opposite or far corner of the line over which the level stock is placed and the necessary movement of the stock is made until the said far corner is brought into the center of the telescope, care being used to see that the pointer remains in its former position with respect to the zero mark of the scale. After these settings of the stock and telescope are obtained, the telescope is then swung around until the pointer coincides with the 90° mark and this will then give the second line perpendicular to the line over which the stock is placed and, by the use of the telescope in the usual manner, the far corner of the foundation can then be laid off along this second line. After these two lines are established, the laying off of the remainder of the foundation may be easily accomplished.

In using the instrument for the purpose of leveling a foundation the following procedure is followed. Three stakes are driven into the ground at one corner of the previous laid off foundation outline and these stakes are connected by two batter boards so that each will extend parallel with a side of the foundation line and while they may be at any height desired, the top edges thereof shall be level and they shall be at right angles to one another. After the stock of the instrument has been set up upon one of the boards to extend lengthwise thereon, stakes are set up at each of the other corners of the foundation by sighting through the telescope so as to get the stakes in the right positions with regard to the other corners of the foundation and each of these stakes has a mark made thereon at the level of the telescope. It will be understood that these marks made upon the stakes will be as much too high as the center of the telescope is removed from the bottom edge of the level stock which rests upon the batter boards and, therefore, to determine the proper point on each stake which will be at the same level as the batter board upon which the level stock and transit is mounted, it is necessary to determine exactly the distance between the bottom edge of the level stock and the center of the telescope and then measure down on each stake from the mark made thereon, a distance equal to the distance from the center of the telescope to the bottom of the level. It will be readily apparent that the distance from the bottom of the level to the center of the telescope can be readily found by raising the sighting gauge 40 and then measure from the bottom edge of the telescope to the top edge of this gauge. After the distance between these edges of the instrument is determined, a notation can be made so as to save having to repeat this operation each time a foundation is leveled.

I claim:—

1. An instrument of the character described, comprising a level stock, leveling means carried by the stock, said stock having a chamber therein which opens through the top edge of the stock body, a pair of arms pivotally secured at one end in the chamber to be swung to upright position therein, and a transit supported by said arms constantly in parallel relation with the said top edge of the body and movable from within the chamber to a position above the body and in horizontal relation therewith when the arms are swung to said upright position.

2. An instrument of the character described, comprising an elongated body having a straight top edge, said body having a chamber therein opening through said top edge, means carried by the body for leveling of same, a telescope adapted to be positioned in the chamber, and pivotally mounted telescope supporting means within the chamber which is so constructed and arranged that on being oscillated in one direction will raise the telescope from and maintain it in the horizontal position which it occupied in the chamber to a plane above and parallel with the said top edge of said body.

3. An instrument of the character described, comprising an elongated body having a straight top edge, said body having a chamber therein opening through said top edge, means carried by the body for levelling of same, a telescope adapted to be positioned in the chamber, pivotal supporting means within the chamber for the telescope which is so constructed and arranged that on being moved to one position the telescope will be raised to a plane above and parallel with the said top edge of said body, and means carried by said body adjacent one end for use in adjusting the telescope relative to said top edge to bring the telescope into parallel relation with said edge.

4. An instrument of the character described, comprising an elongated straight body having a straight top edge, said body having a chamber therein opening through said top edge, means carried by the body for leveling of the same, a telescope of a size to fit in said chamber, a supporting plate for said telescope, a pair of hinged arms each pivotally secured in the lower part of said chamber whereby it may swing upwardly to a vertical position in the chamber, each of said hinged arms having its upper part attached to said plate, and the attaching means between the upper part of one of said hinged arms and the plate being adjustable for the raising and lowering of the adjacent end of the telescope.

5. An instrument of the character described, comprising an elongated body having a straight top edge, a chamber within the body opening through said edge, a pair of arm members each pivotally secured at one end within the lower part of the chamber whereby it may be raised to a vertical position therein, an extension for and pivotally connected with the free end of each arm, a plate joined to and connecting said extensions, one of said extensions being in the form of a screw adjustably connected to the plate, a telescope of a size to be positioned in the chamber, and means pivotally coupling the telescope to the central part of said plate, said arms and the extensions thereof being together of sufficient length to raise the telescope to a position above the said edge of the body when the arms are raised in the chamber.

6. An instrument of the character described, comprising an elongated body having a straight top edge, a chamber within the body opening through said edge, a pair of arm members each pivotally secured at one end within the lower part of the chamber whereby it may be raised to a vertical position therein, an extension for and pivotally connected with the free end of each arm, a plate joined to and connecting said extensions, one of said extensions being in the form of a screw adjustably connected to the plate, a telescope of a size to be positioned in the chamber, means pivotally coupling the telescope to the central part of said plate, said arms and the extensions thereof being together of sufficient length to raise the telescope to a position above the said edge of the body when the arms are raised in the chamber, and a gauge means carried by the body upon said edge and adjacent one end for use in conjunction with said adjusting screw to arrange said telescope in a position parallel with said straight edge after the telescope is raised from the chamber.

7. An instrument of the character described, comprising an elongated body having a straight top edge, means carried by the body for leveling the same on a supporting structure, said body having a chamber therein opening through said top edge, a pair of arms disposed in spaced relation within the chamber and pivotally secured to the bottom of the same, a telescope of a size to be positioned lengthwise in the chamber, a supporting plate for the telescope, means pivotally coupling the telescope with said plate whereby the telescope may have oscillatory movement in either a horizontal or a vertical plane, a rigid hinge leaf pivotally secured to and forming an extension of the free end of one arm and rigidly secured to said plate adjacent one end of the latter, a screw pivotally attached to the free end of the other arm and extending through an aperture in and adjacent the other end of said plate, adjusting nuts carried by the screw and having the plate secured therebetween, and means for securing said arms in vertical position within the chamber when the telescope has been removed from the chamber by the upward swinging of the arms.

8. An instrument of the character described, comprising an elongated body having a straight top edge, means carried by the body for leveling the same on a supporting structure, said body having a chamber therein opening through said top edge, a pair of arms disposed in spaced relation within the chamber and pivotally secured to the bottom of the same, a telescope of a size to be positioned lengthwise in the chamber, a supporting plate for the telescope, means pivotally coupling the telescope with said plate whereby the telescope may have oscillatory movement in either a horizontal or a vertical plane, a rigid hinge leaf pivotally secured to and forming an extension of the free end of one arm and rigidly secured to said plate adjacent one end of the latter, a screw pivotally attached to the free end of the other arm and extending through an aperture in and adjacent the other end of said plate, adjusting nuts carried by the screw and having the plate secured therebetween, means for securing said arms in vertical position within the chamber when the telescope has been removed from the chamber by the upward swinging of the arms, and a cover plate for the chamber carried upon the top of the telescope.

9. An instrument of the character described, comprising an elongated body having a straight top edge, means carried by the body for leveling the same on a supporting structure, said body having a chamber therein opening through said top edge, a pair of arms disposed in spaced relation within the chamber and pivotally secured to the bottom of the same, a telescope of a size to be positioned lengthwise in the chamber, a supporting plate for the telescope, means pivotally coupling the telescope with said plate whereby the telescope may have oscillatory movement in either a horizontal or a vertical plane, a rigid hinge leaf pivotally secured to and forming an extension of the free end of one arm and rigidly secured to said plate adjacent one end of the latter, a screw pivotally attached to the free end of the other arm and extending through an aperture in and adjacent the other end of said plate, adjusting nuts carried by the screw and having the plate secured therebetween, means for securing said arms in vertical position within the chamber when the telescope has been removed from the chamber by the upward swinging of the arms, and supporting means carried by the plate and engaged by the telescope when the same is disposed parallel with the plate to prevent oscillation of the telescope while the latter is in the chamber.

10. An instrument of the character described, comprising an elongated body having a straight top edge, means carried by the body for leveling the same on a supporting structure, said body having a chamber therein opening through said top edge, a pair of arms disposed in spaced relation within the chamber and pivotally secured to the bottom of the same, a telescope of a size to be positioned lengthwise in the chamber, a supporting plate for the telescope, means pivotally coupling the telescope with said plate whereby the telescope may have oscillatory movement in either a horizontal or a vertical plane, a rigid hinge leaf pivotally secured to and forming an extension of the free end of one arm and rigidly secured to said plate adjacent one end of the latter, a screw pivotally attached to the free end of the other arm and extending through an aperture in and adjacent the other end of said plate, adjusting nuts carried by the screw and having the plate secured therebetween, means for securing said arms in vertical position within the chamber when the telescope has been removed from the chamber by the upward swinging of the arms, a protractor plate, means for securing the plate beneath the telescope with the radial center thereof upon the center of horizontal oscillation for the telescope, and a pointer carried by said pivotal means for coaction with said protractor plate.

11. An instrument comprising a level stock having a chamber therein and opening through one edge thereof, a telescope, a supporting plate for the telescope, means for raising said telescope on the plate from a position in the chamber to a position above the stock while maintaining said telescope and plate substantially parallel with one another and parallel as a unit with the said one edge of the stock above which the telescope is raised.

12. An instrument comprising a level stock having a chamber therein and opening through one edge thereof, a telescope, a supporting plate for the telescope, means for raising said telescope on the plate from a position in the chamber to a position above the stock while maintaining said telescope and plate substantially parallel with one another and parallel as a unit with the said one edge of the stock above which the telescope is raised, and means for adjusting one end of the plate relative to the stock for establishing said parallelism between the plate and level as one unit and the stock as another unit.

13. An instrument comprising a level stock having a chamber therein and opening through one edge thereof, a telescope, a supporting plate for the telescope, a pivotal connection between the plate and telescope permitting the telescope to be swung in a plane parallel with the adjacent surface of the plate and in a plane perpendicular to said surface, means for raising the telescope and the plate as a unit from within the chamber to a position above the stock, and means for maintaining the telescope against movement in said last mentioned plane when the telescope and plate are disposed in parallel relation.

14. An instrument comprising a level stock having a chamber therein and opening through one edge thereof, a telescope, a supporting plate for the telescope, a pivotal connection between the plate and telescope permitting the telescope to be swung in a plane parallel with the adjacent surface of the plate and in a plane perpendicular to said surface, means for raising the telescope and the plate as a unit from within the chamber to a position above the stock, a protractor scale disposed beneath the telescope concentric with the center of rotation of the telescope in said first plane, and pointer means movable with the telescope over said scale upon rotation of the same on said center.

MATTHEW J. CROSBY.